United States Patent [19]
Elms et al.

[11] Patent Number: 5,677,974
[45] Date of Patent: Oct. 14, 1997

[54] HYBRID COMMUNICATIONS AND POWER CABLE AND DISTRIBUTION METHOD AND NETWORK USING THE SAME

[75] Inventors: Ronald Duane Elms, Huntington; John Garland Messina, Wallingford; Dwight Apollos Phelps, Windsor Locks; John Joseph Wells, Hamden, all of Conn.

[73] Assignee: Southern New England Telephone Company, New Haven, Conn.

[21] Appl. No.: 519,998

[22] Filed: Aug. 28, 1995

[51] Int. Cl.$^6$ .................................................. G02B 6/44
[52] U.S. Cl. .................. 385/101; 385/114; 385/109; 385/113
[58] Field of Search ................................ 385/100–114

[56] References Cited

U.S. PATENT DOCUMENTS

| | | | |
|---|---|---|---|
| 33,459 | 11/1861 | Bohannon, Jr. et al. | 385/107 |
| 4,009,932 | 3/1977 | Ferrentino | 385/106 |
| 4,278,835 | 7/1981 | Jackson | 385/101 |
| 4,317,000 | 2/1982 | Ferer | 385/104 |
| 4,371,234 | 2/1983 | Parfree et al. | 385/103 |
| 4,375,313 | 3/1983 | Anderson et al. | 385/103 |
| 4,460,419 | 7/1984 | Parfree et al. | 385/101 |
| 4,479,702 | 10/1984 | Pryor et al. | 385/101 |
| 4,484,963 | 11/1984 | Anctil et al. | 385/107 |
| 4,490,009 | 12/1984 | Nakai et al. | 385/101 |
| 4,491,387 | 1/1985 | Dey et al. | 385/101 |
| 4,557,560 | 12/1985 | Bohannon, Jr. et al. | 305/107 |
| 4,600,268 | 7/1986 | Spicer | 385/103 |
| 4,606,604 | 8/1986 | Soodak | 385/101 |
| 4,630,887 | 12/1986 | Taylor | 350/96.23 |
| 4,632,506 | 12/1986 | Taylor | 350/96.23 |
| 4,657,342 | 4/1987 | Baüer | 385/103 |
| 4,695,127 | 9/1987 | Ohlhaber et al. | 350/96.23 |
| 4,793,686 | 12/1988 | Saito | 385/101 |
| 4,801,192 | 1/1989 | Wehner | 385/101 |
| 4,852,965 | 8/1989 | Mullin et al. | 350/96.23 |
| 4,895,426 | 1/1990 | Pinson | 385/101 |
| 4,896,939 | 1/1990 | O'Brien | 385/56 |
| 4,952,012 | 8/1990 | Stamnitz | 385/101 |
| 4,957,345 | 9/1990 | Sakuma et al. | 385/103 |
| 5,013,126 | 5/1991 | Hattori et al. | 385/103 |
| 5,039,195 | 8/1991 | Jenkins et al. | 385/101 |
| 5,048,922 | 9/1991 | Mochizuki et al. | 385/103 |
| 5,125,062 | 6/1992 | Marlier et al. | 385/101 |
| 5,199,096 | 3/1993 | Kathiresan et al. | 385/109 |
| 5,202,944 | 4/1993 | Riordan | 385/101 |
| 5,230,033 | 7/1993 | Soodak | 385/103 |
| 5,274,725 | 12/1993 | Bottoms, Jr. et al. | 385/105 |
| 5,275,038 | 1/1994 | Sizer et al. | 385/101 |

*Primary Examiner*—John Ngo
*Attorney, Agent, or Firm*—Morgan & Finnegan, L.L.P.

[57] ABSTRACT

A hybrid cable for distributing communications signals and three-phase moderate-voltage alternating current, and a distribution method and network using the hybrid cable. The cable includes a hollow conduit, an optical fiber pulled through the conduit and housed within the conduit, power conductors disposed around the conduit, and a sheath which provides both structural protection and dielectric properties encasing the power conductors.

24 Claims, 1 Drawing Sheet

HYBRID COMMUNICATIONS AND POWER CABLE AND DISTRIBUTION METHOD AND NETWORK USING THE SAME

1. Technical Field

This invention relates generally to hybrid cables for distributing communications signals and power, and, more particularly, to a multi-conductor hybrid optical communications and power cable. The invention further relates to method of, and a network for, distributing optical signals ad equipment-energizing power over such a cable.

2. Background of the Invention

Fiber optic cables are increasingly used to transmit video, voice ad data signals. Some advantages of fiber optics for transmitting communications signals include an immunity of optical signals to electromagnetic interference and the small size, light weight and wide bandwidths of optical fibers.

In an illustrative fiber optic network, electrical signals are converted to optical signals by a electrical-to-optical transmitter at a sending site. The optical signals are transmitted via an optical fiber to optical-to-electrical receivers at a receiving location. The receivers couple light out of the optical fibers and convert the contained signals back into electrical signals. Optical receivers are active network components—that is, they require power to operate.

Optical repeaters, which amplify and regenerate optical signals at interim points along an optical fiber path, are also active network components. The distances which optical signals can travel prior to amplification and regeneration by optical repeaters vary according to the type of optical fiber and other factors.

Sufficient current and voltage to power optical-to-electrical receivers, optical repeaters and other related active elements cannot be transmitted via optical fibers. In providing power to these active components, it has often been necessary to rely on power transmitted by an electric utility. Thus, if electric utility power is interrupted, the fiber optic network's operation is disrupted.

Hybrid cables having both optical fibers and electrical conductors, and networks utilizing such cables, are well known. In general, however, known hybrid cable constructions have included optical fibers which are permanently fixed within the cable prior to the cable's installation. This requires time consuming operations at splicing and terminal points to separate the optical fiber and metallic conductors from each other and from the other cable components. Further, neither prior hybrid cables nor the networks utilizing the cables have provided satisfactory distribution of equipment-energizing power over wide areas.

SUMMARY OF THE INVENTION

According to the present invention, the foregoing and other disadvantages are ameliorated, while simultaneously satisfying code requirements, by a hybrid cable including a hollow conduit adapted to have an optical fiber pulled through and housed within the conduit subsequent to the cable's installation; a plurality of groups of power conductors disposed around the hollow conduit; and a sheath with one or more layers for providing both structural protection and dielectric properties encasing the power conductors.

Other aspects of the invention include means within the conduit to facilitate the subsequent installation of the optical fiber. These means take the form of a lubricated surface on the conduit wall and/or a pulling ribbon in the conduit.

In one preferred embodiment, the groups of power conductors are helically disposed and include stranded aluminum, each group being surrounded by an insulation layer. Filler material may be interspersed between the groups of power conductors, the filler material and groups of power conductors forming a substantially toroidal core and being wrapped with tape, e.g., mylar tape.

In still further embodiments, the hollow conduit may be constructed of a polymer such as polyethylene. A first layer of the sheath encasing the power conductors may be steel, and a second layer of the sheath may be polyethylene.

The preferred embodiment may also include space within the conduit to store additional optical fibers for system growth, e.g., for nodes which may be added at later dates.

In accordance with another aspect of the invention, a method of distributing power and optical signals includes installing a cable between a source location and another relatively remote location, the cable including a hollow conduit, power conductors disposed around the hollow conduit, and a sheath with one or more layers encasing the power conductors; pulling an optical fiber through the hollow conduit to provide a link between the locations, so that the cable transmits optical signals on the optical fiber and power on the power conductors; isolating the power from the optical signals; and converting at the remote location the power transmitted by the cable for use in powering active components in the network.

In accordance with still another aspect of the invention, a network for distributing power and optical signals to a relatively remote location includes a centrally located alternating current power supply; a hybrid cable for providing optical signals and for transmitting power from the centrally located power supply to the remote location, the cable including a hollow conduit, an optical fiber pulled therethrough and housed therein subsequent to the cable's installation, power conductors disposed around the conduit, and a sheath with one or more layers encasing the power conductors; a terminal located at the remote location for isolating the power from the optical signals; and a power supply in communication with the terminal, for receiving the power transmitted by the cable for use in powering active components in the network.

Other advantages of the present invention will become readily apparent to those skilled in the art from the following description of the preferred embodiment of the invention which has been shown and described by way of illustration, as the best mode contemplated of carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
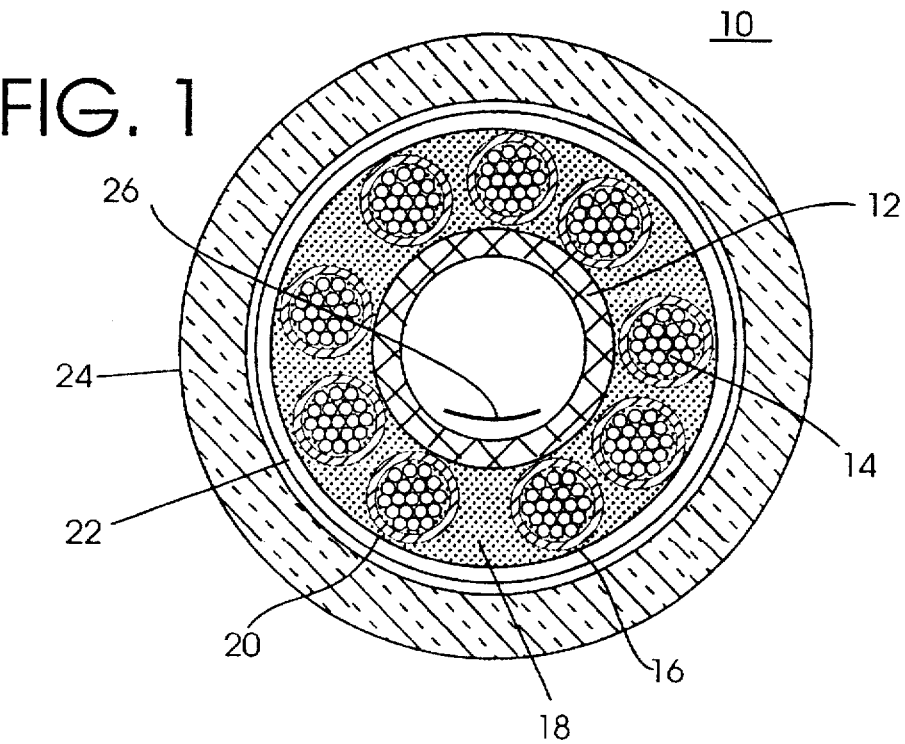
FIG. 1 illustrates a hybrid communications and power cable according to the preferred embodiment of the present invention.

FIG. 1 illustrates a hybrid optical communications and power cable 10 constructed in accordance with the preferred embodiment of the present invention. The cable depicted in FIG. 1 has a diameter of 2.621 inches, is suitable for use in 600 volt phase-to-phase power applications, and can withstand temperatures up to 75 degrees Celsius.

A hollow duct 12, which may be made of lubricated plastic such as polyethylene and is approximately one inch in diameter in the preferred embodiment, is surrounded by strands of power conductors 14, which may be aluminum. The power conductors 14 are grouped together and are surrounded by an insulating material 16. The insulating material 16 in the preferred embodiment is 0.055 inches thick, and conforms to ICEA s-61-402, Part 6 standards, incorporated herein by reference. The groups of power conductors 14 include multiple circuits capable of transmitting three-phase alternating current at voltages up to 600 volts.

The groups of power conductors 14 are wound helically around the hollow duct 12. In the preferred embodiment, the power conductors 14 are cabled with a left-hand lay no greater than 15 times the diameter of the cable core. A filler material 18 is interspaced between the groups of power conductors 14, the filler material 18 and groups of power conductors 14 together forming a substantially toroidal core 20, which may be wrapped with a polyester material such as mylar tape. In the preferred embodiment, the polyester tape is 0.003 inches thick, and is wrapped with a 50% overlap.

A metallic sheath 22, for example laterally corrugated steel zetabon tape laminated with an ethylene-acrylic acid co-polymer on each side, encloses the round core 20 so as to make the core 20 watertight and corrosion-resistant, and to impart structural strength and flexibility to the cable 10. A bead of nylon (not shown) may run continuously under the tape overlap to seal the sheath 22.

An outer dielectric jacket 24, for example extruded polyethylene, encases the metallic sheath 22. In a preferred embodiment, the outer jacket 24 is 0.110 inches thick, and conforms to ICEA s-61-402, Part 6 standards. The outer jacket 24 resists environmental stresses such as weathering, sunlight and temperature extremes, and mechanical stresses such as those which cause abrasion and cracking and which are encountered during cable installation and service. The outer jacket 24 may also be marked on its surface. In the preferred embodiment, the cable surface includes three yellow longitudinal stripes (not shown) spaced 120 degrees apart.

Installation

The hybrid cable according to the present invention may be installed in desired lengths using well-known methods. For example, the cable may be installed aerially, in duct, or buried directly. A typical length for the hybrid cable of the preferred embodiment is approximately 1200 feet.

After a length of hybrid cable is installed, a length of optical fiber (not shown) is pulled through the hollow duct 12 using, e.g., a pulling ribbon 26 pre-installed in the hollow duct 12. The hollow duct 12 provides storage space for spare optical fibers, which may be subsequently used for, e.g., system growth.

Figure 2:
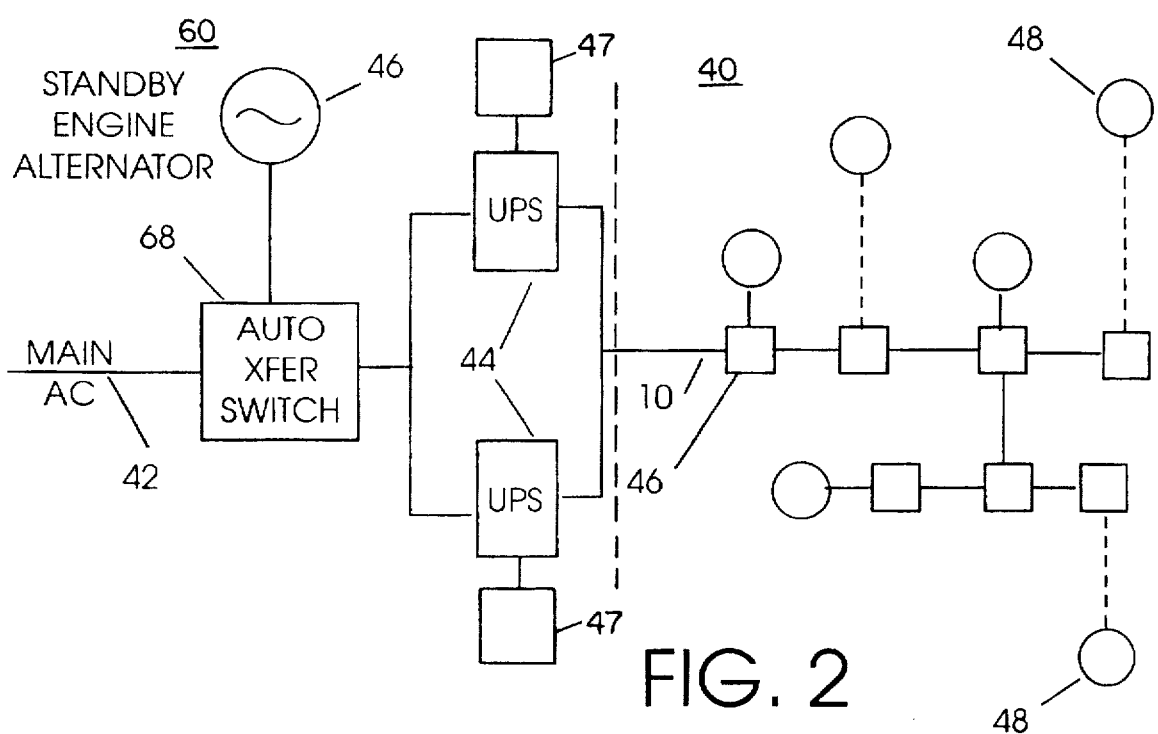
FIG. 2 illustrates a network architecture for distributing power and optical signals from a central location to a remote location using the hybrid cable of the preferred embodiment of the present invention.

FIG. 2 illustrates a network architecture 40 for distributing power and optical signals from a central location 60 to remote locations 46, 48 using the hybrid cable 10 of the present invention.

At the central location 60 a main source of alternating current 42, for example current purchased from an electric utility, powers uninterruptible power supplies 44, which supply regulated, reliable alternating current to the network. The uninterruptible power supplies 44 illustratively provide 480 volts phase-to-phase power. Redundancy is provided so that failure of one of the power supplies 44 does not disrupt operation of the network 40.

Standby power is provided by an alternate on-site primary source, such as an engine-driven alternator 46, which produces alternating current to replace lost electric utility power. An automatic transfer switch 68 allows for automatic switching between current sources 42, 46.

In addition, in the event that the current flow from main source 42 is interrupted prior to the engine alternator 46 coming on line, a battery operated power supply 47 provides reserve power to the uninterruptible power systems 44 for a period, such as four hours, sufficient to enable corrective measures in most circumstances. Thus, failure of a single power system component does not disrupt operation of the network 40.

As noted above, the hybrid communications and power cable 10, the preferred embodiment of which was discussed in connection with FIG. 1, connects the central location 60 to remote locations, for example splice terminals 46, and connects splice terminals to other splice terminals. Splice terminals may in turn be in communication with other remote sites, such as remote optical and electrical nodes 48.

Network Splicing and Terminal Details

Splice terminals 46 isolate power circuits from fiber optic communication circuits carried by the hybrid cable 10. Hardware and techniques for splicing cables are well known and commercially available.

Alternating current from a spliced hybrid cable (not shown) is supplied to a power supply (not shown) located at each remote node 48. The power supply may be of a type well known in the art, such as a regulated ferroresonant transformer, having an input side connected to the spliced hybrid cable and an output side connected to a traditional coaxial cable (not shown). The coaxial cable in turn supplies power to active network components such as optical repeaters (not shown) and optical-to-electrical interface equipment (not shown). Thus, there is no need to utilize electric utility power at the remote nodes.

A smaller version of the power source within the central location 60, having a similar architecture as the power sources 42, 44, 46 and 47 at the central location 60, may be used to serve the network where distribution distances are beyond the electrical limitations of the preferred embodiment of the network. Similarly, the dimensions of, and number of conductors within, hybrid cable 10 utilized in network 40 may vary according to the length of the cable 10 and the amount of power and/or communications signals the cable 10 must transmit.

We claim:

1. A hybrid cable for providing optical signals and power to a remote location, comprising:

a hollow conduit adapted to have an optical fiber pulled therethrough and housed therein after said cable is deployed;

a plurality of insulated power conductors disposed around the hollow conduit; and a sheath encasing the power conductors, said sheath having one or more layers for providing both structural protection and dielectric properties.

2. A hybrid cable according to claim 1 further comprising means in said conduit for facilitating the pulling of said optical fiber through said conduit.

3. A hybrid cable according to claim 2 wherein said means comprise a lubricated surface.

4. A hybrid cable according to claim 2 wherein said means comprise a pulling ribbon.

5. A hybrid cable according to claim 1 or 2, wherein said plurality of power conductors comprise stranded aluminum.

6. A hybrid cable according to claim 1 or 2, further comprising an insulation layer surrounding said plurality of aluminum power conductors.

7. A hybrid cable according to claim 1 or 2, further comprising a filler material interspaced between said plurality of power conductors, so that the power conductors and the filler material form a substantially annular core.

8. A hybrid cable according to claim 7, further comprising a layer of mylar tape wrapped around said core.

9. A hybrid cable according to claim 1 or 2, wherein said hollow conduit comprises polyethylene.

10. A hybrid cable according to claim 1 or 2, wherein a first layer of said sheath encasing said power conductors comprises steel tape.

11. A hybrid cable according to claim 1 or 2, wherein a second layer of said sheath encasing said power conductors comprises polyethylene.

12. A hybrid cable according to claim 11, further comprising a plurality of longitudinal stripes on the second layer of said sheath.

13. A hybrid cable according to claim 1 or 2, wherein said hollow conduit is dimensioned to provide space for extra optical fiber.

14. A hybrid cable for providing optical signals and power to a remote location, comprising:
   a hollow plastic conduit adapted to have an optical fiber pulled therethrough and housed therein after said cable is deployed;
   a plurality of insulated power conductors disposed helically around the plastic conduit;
   a metallic sheath encasing the power conductors, so that a watertight assembly is formed; and
   a dielectric outer jacket covering the metallic sheath.

15. A method of distributing power and optical signals to a remote location, comprising:
   (1) installing a cable originating at a central location and terminating at the remote location, the cable comprising
      a hollow conduit,
      a plurality of power conductors disposed around the hollow conduit,
      a sheath encasing the power conductors, said sheath having one or more layers for providing both structural strength and dielectric properties;
   (2) pulling an optical fiber through the hollow conduit from the central location to the remote location, so that the cable transmits optical signals on the optical fiber and three-phase power on the power conductors;
   (3) isolating the power from the optical signals; and
   (4) converting at the remote location the power transmitted by the cable for use in powering an active component in the network.

16. A network for distributing power and optical signals to a remote location, comprising:
   a centrally located three-phase alternating current power supply;
   a hybrid cable for providing optical signals and for transmitting power from said centrally located power supply to the remote location, said hybrid cable comprising
      a hollow conduit adapted to have an optical fiber pulled therethrough and housed therein,
      a plurality of power conductors disposed around the hollow conduit,
      a sheath encasing the power conductors, said sheath having one or more layers for providing both structural protection and dielectric properties;
   a terminal located at the remote location for isolating the power from the optical signals; and
   a power supply in communication with the terminal, said power supply receiving the power transmitted by said hybrid cable for use in powering an active component in the network.

17. A network according to claim 16 including means in said conduit facilitating the pulling therethrough of said optical fiber.

18. A network for distributing power and optical signals to a remote location according to claim 16 or 17, wherein said centrally located power supply comprises at least one uninterruptible power supply.

19. A network for distributing power and optical signals to a remote location according to claim 16 or 17, wherein said centrally located power supply comprises another primary source.

20. A network for distributing power and optical signals to a remote location according to claim 19, wherein the other primary source comprises an engine alternator.

21. A network for distributing power and optical signals to a remote location according to claim 16 or 17, wherein said centrally located power supply comprises an electric utility.

22. A network for distributing power and optical signals to a remote location according to claim 16 or 17, wherein the active network component comprises an optical repeater.

23. A network for distributing power and optical signals to a remote location according to claim 16 or 17, wherein the active network component comprises an optical-to-electrical receiver.

24. A hybrid cable according to claim 1, wherein said sheath forms a watertight casing around said power conductors.

* * * * *